United States Patent
Zhang et al.

(10) Patent No.: US 12,323,189 B2
(45) Date of Patent: Jun. 3, 2025

(54) CLUSTER LIGHT SOURCE AND METHOD FOR GENERATING CLUSTER LIGHT SOURCE

(71) Applicant: HUAWEI TECHNOLOGIES CO., LTD., Shenzhen (CN)

(72) Inventors: Xin Zhang, Dongguan (CN); Xu Sun, Shenzhen (CN); Yanbo Li, Dongguan (CN)

(73) Assignee: Huawei Technologies Co., Ltd, Shenzhen (CN)

(*) Notice: Subject to any disclaimer, the term of this patent is extended or adjusted under 35 U.S.C. 154(b) by 217 days.

(21) Appl. No.: 18/070,160

(22) Filed: Nov. 28, 2022

(65) Prior Publication Data

US 2023/0090402 A1 Mar. 23, 2023

Related U.S. Application Data

(63) Continuation of application No. PCT/CN2021/093972, filed on May 15, 2021.

(51) Int. Cl.
*H04B 10/50* (2013.01)
*H04J 14/02* (2006.01)

(52) U.S. Cl.
CPC .......... *H04B 10/506* (2013.01); *H04J 14/022* (2013.01)

(58) Field of Classification Search
CPC ............................. H04J 14/022; H04B 10/506
USPC ............................................................ 398/83
See application file for complete search history.

(56) References Cited

U.S. PATENT DOCUMENTS

| 10,355,804 B2* | 7/2019 | Nagarajan ........... H04J 14/0307 |
| 10,826,613 B1* | 11/2020 | Liang .................... H01S 5/0234 |
| 2001/0013967 A1 | 8/2001 | Tsumura |
| 2002/0145778 A1 | 10/2002 | Strasser et al. |
| 2003/0095736 A1 | 5/2003 | Kish, Jr. et al. |
| 2014/0334818 A1* | 11/2014 | Mehrvar ............. H04J 14/0258 398/51 |

(Continued)

FOREIGN PATENT DOCUMENTS

| CN | 101952714 A | 1/2011 |
| CN | 103609083 A | 2/2014 |
| CN | 111147130 A | 5/2020 |

*Primary Examiner* — Dalzid E Singh
(74) *Attorney, Agent, or Firm* — Leydig, Voit & Mayer, Ltd.

(57) ABSTRACT

A cluster light source and a method for generating a cluster light source is provided. A multi-wavelength cluster light source includes: a light source, an optical multiplexer, an optical splitter, and an optical amplifier array. The light source outputs a plurality of single-wavelength continuous-wave light having different wavelengths in parallel. The optical multiplexer combines the plurality of single-wavelength continuous-wave light into one multi-wavelength continuous-wave light. The optical splitter performs power beam splitting on the multi-wavelength continuous-wave light, to output a plurality of multi-wavelength continuous-wave light. The optical amplifier array amplifies the plurality of multi-wavelength continuous-wave light, to output a plurality of other multi-wavelength continuous-wave light. Optionally, the cluster light source further includes a backup light source and an optical switch array.

15 Claims, 8 Drawing Sheets

(56) References Cited

U.S. PATENT DOCUMENTS

| | | | |
|---|---|---|---|
| 2016/0150300 A1* | 5/2016 | Sato | H04J 14/0209 |
| | | | 398/50 |
| 2017/0180042 A1* | 6/2017 | Luo | G01M 11/3145 |
| 2020/0119828 A1* | 4/2020 | Sahni | G02B 6/4213 |
| 2023/0352897 A1* | 11/2023 | Popovic | H04B 10/503 |

* cited by examiner

| S801: Obtain a plurality of single-wavelength continuous-wave light, where wavelengths of the plurality of single-wavelength continuous-wave light are different |
|---|

| S803: Perform combination, beam splitting, and amplification processing on the plurality of single-wavelength continuous-wave light to obtain a plurality of multi-wavelength continuous-wave light |
|---|

CLUSTER LIGHT SOURCE AND METHOD FOR GENERATING CLUSTER LIGHT SOURCE

CROSS-REFERENCE TO RELATED APPLICATIONS

This application is a continuation of International Application No. PCT/CN2021/093972 filed on May 15, 2021, which claims priority to Chinese Patent Application No. 202010475727.0, filed on May 29, 2020. The disclosures of the aforementioned applications are hereby incorporated by reference in their entireties.

TECHNICAL FIELD

Embodiments of the present invention relate to the field of optical components, and in particular, to a cluster light source and a method for generating a cluster light source.

BACKGROUND

A long-term research direction in the optical communication field is how to provide a multi-wavelength light source that features excellent optical performance, long reliable operation time, and insensitivity to impact of an external environment at a source of a communication link. With the continuous increase of a communication capacity, the multi-wavelength light source tends to be densely deployed. Currently, a relatively large quantity of multi-wavelength light sources are deployed (that is, light source modules with similar functions are deployed in batches) to meet this requirement.

SUMMARY

Embodiments of this application provide a cluster light source and a method for generating a cluster light source, so as to improve stability of a multi-wavelength light source and reduce costs.

According to a first aspect, an embodiment of this application provides a multi-wavelength cluster light source. The multi-wavelength cluster light source includes a first light source, an optical multiplexer, a first optical splitter and an optical amplifier array. The first light source is used to output a plurality of single-wavelength continuous-wave light in parallel, and wavelengths of the plurality of single-wavelength continuous-wave light are different. The optical multiplexer is configured to combine the plurality of single-wavelength continuous-wave light into one first multi-wavelength continuous-wave light. The first optical splitter is configured to perform power beam splitting on the first multi-wavelength continuous-wave light, to output a plurality of second multi-wavelength continuous-wave light. The optical amplifier array is used to amplify the plurality of second multi-wavelength continuous-wave light, to output a plurality of third multi-wavelength continuous-wave light.

A single light source is split by using an optical splitter and an optical amplifier, so that compared with the conventional technology, the technical solution provided in this embodiment of this application can provide a larger quantity of multi-wavelength cluster light sources with uniform and stable performance. In addition, the technical solution has a simple structure and relatively low costs.

Optionally, the multi-wavelength cluster light source further includes a second optical splitter, configured to perform power beam splitting on some or all of the plurality of third multi-wavelength continuous-wave light, to output a plurality of fourth multi-wavelength continuous-wave light. A quantity of second optical splitters is less than or equal to a quantity of the plurality of third wavelength continuous-wave light. Through two-stage optical splitting, this optional solution can increase a quantity of provided multi-wavelength light sources by using a relatively simple structure design.

Optionally, the multi-wavelength cluster light source further includes an optical switch array. The optical switch array is used to receive the plurality of single-wavelength continuous-wave light and a plurality of other single-wavelength continuous-wave light output by a second light source. Wavelengths of the plurality of other single-wavelength continuous-wave light are in a one-to-one correspondence with the wavelengths of the plurality of single-wavelength continuous-wave light. A quantity of optical switches included in the optical switch array is equal to a quantity of the plurality of single-wavelength continuous-wave light, and each optical switch of the optical switch array is used to select any one of two single-wavelength continuous-wave light with a same wavelength in the plurality of single-wavelength continuous-wave light or in the plurality of other single-wavelength continuous-wave light, and input the selected single-wavelength continuous-wave light into the optical multiplexer. Correspondingly, that the optical multiplexer is configured to combine the plurality of single-wavelength continuous-wave light into the first multi-wavelength continuous-wave light specifically includes: The optical multiplexer is configured to combine a plurality of single-wavelength continuous-wave light selected and output by the optical switch into the first multi-wavelength continuous-wave light. By using the optical switch array, this optional solution can provide wavelength-level backup. Compared with the conventional technology in which the multi-wavelength light source can be replaced only as a whole, this solution is implemented at lower costs.

Optionally, the optical multiplexer and the first optical splitter are integrated in a single chip. Similarly, optionally, the optical switch array, the optical multiplexer, and the first optical splitter are integrated in a single chip. This optional solution can reduce a volume of the multi-wavelength cluster light source.

Optionally, the multi-wavelength cluster light source further includes the second light source.

According to a second aspect, an embodiment of this application provides a multi-wavelength cluster light source. The multi-wavelength cluster light source includes a first light source, an optical amplifier array, an optical multiplexer, and a first optical splitter. The first light source is used to output a plurality of first single-wavelength continuous-wave light in parallel, and wavelengths of the plurality of first single-wavelength continuous-wave light are different. The optical amplifier array is used to amplify the plurality of first single-wavelength continuous-wave light. The optical multiplexer is configured to combine the plurality of amplified first single-wavelength continuous-wave light into one first multi-wavelength continuous-wave light. The first optical splitter is configured to perform power beam splitting on the first multi-wavelength continuous-wave light, to output a plurality of second multi-wavelength continuous-wave light.

A single light source is split by using an optical splitter and an optical amplifier, so that compared with the conventional technology, the technical solution provided in this embodiment of this application can provide a larger quantity of multi-wavelength cluster light sources with uniform and stable performance. In addition, the optical amplifier array is used to amplify a single wavelength and has relatively low costs.

Optionally, the multi-wavelength cluster light source further includes a second optical splitter, configured to perform power beam splitting on each of the plurality of amplified single-wavelength continuous-wave light, to output a plurality of second single-wavelength continuous-wave light. Correspondingly, that the optical multiplexer is configured to combine the plurality of amplified first single-wavelength continuous-wave light into one first multi-wavelength continuous-wave light specifically includes: The optical multiplexer is configured to combine the plurality of second single-wavelength continuous-wave light with different wavelengths into the first multi-wavelength continuous-wave light; and a quantity of the optical multiplexers is equal to a quantity of the plurality of second single-wavelength continuous-wave light obtained by performing power beam splitting on any one of the plurality of first single-wavelength continuous-wave light. Through two-stage optical splitting, this optional solution can increase a quantity of provided multi-wavelength light sources by using a relatively simple structure design.

Optionally, the multi-wavelength cluster light source further includes an optical switch array. The optical switch array is used to receive the plurality of first single-wavelength continuous-wave light and a plurality of third single-wavelength continuous-wave light output by the second light source. Wavelengths of the plurality of third single-wavelength continuous-wave light are in a one-to-one correspondence with the wavelengths of the plurality of first single-wavelength continuous-wave light, and a quantity of optical switches included in the optical switch array is equal to a quantity of the plurality of first single-wavelength continuous-wave light. Each optical switch of the optical switch array is used to select any one of two single-wavelength continuous-wave light with a same wavelength in the plurality of first single-wavelength continuous-wave light or in the plurality of third single-wavelength continuous-wave light, and input the selected single-wavelength continuous-wave light into the optical amplifier array. Correspondingly, that the optical amplifier array is used to amplify the plurality of first single-wavelength continuous-wave light specifically includes: The optical amplifier array is used for a plurality of single-wavelength continuous-wave light selected and output by the optical switch. By using the optical switch array, this optional solution can provide wavelength-level backup. Compared with the conventional technology in which the multi-wavelength light source can be replaced only as a whole, this solution is implemented at lower costs.

Optionally, the optical multiplexer and the first optical splitter are integrated in a single chip.

Optionally, the multi-wavelength cluster light source further includes the second light source.

According to a third aspect, an embodiment of this application provides a communication device. The communication device includes the multi-wavelength cluster light source according to any one of the first aspect, the specific implementations of the first aspect, the second aspect, or the specific implementations of the second aspect, a modulator, and an electronic chip. Multi-wavelength continuous-wave light output by the multi-wavelength cluster light source is used to be input to the modulator, the electronic chip outputs a service signal to the modulator, and the modulator is configured to modulate the service signal to the multi-wavelength continuous-wave light.

Specifically, the communication device is a router, a switch, or an optical communication device.

Optionally, the communication device further includes an optical cross-connection, configured to: perform space switching on the multi-wavelength continuous-wave light carrying the service signal, and then send the multi-wavelength continuous-wave light.

Optionally, the multi-wavelength cluster light source may be alternatively replaced with the single-wavelength cluster light source according to the fourth aspect.

According to a fourth aspect, an embodiment of this application provides a single-wavelength cluster light source. The single-wavelength cluster light source includes a single-wavelength light source, a first optical splitter, an optical amplifier array, and a second optical splitter. A single-wavelength light source is used for one or more single-wavelength continuous-wave light. The first optical splitter, the optical amplifier array, and the second optical splitter are respectively configured to perform first-stage power beam splitting, amplification, and second-stage power beam splitting on continuous-wave light output by the single-wavelength light source, to obtain a relatively large quantity of single-wavelength light sources with uniform and stable performance. In addition, compared with the conventional technology, the single-wavelength light source provided in this solution is relatively small in volume.

According to a fifth aspect, an embodiment of this application provides a method for generating a multi-wavelength light source. The method specifically includes: obtaining a plurality of single-wavelength continuous-wave light, where wavelengths of the plurality of single-wavelength continuous-wave light are different; and performing combination, beam splitting, and amplification processing on the plurality of single-wavelength continuous-wave light to obtain a plurality of multi-wavelength continuous-wave light.

In a possible implementation, combination, beam splitting, and amplification processing may be sequentially performed on the plurality of single-wavelength continuous-wave light to obtain the plurality of multi-wavelength continuous-wave light.

In another possible implementation, amplification, combination, and beam splitting processing may be sequentially performed on the plurality of single-wavelength continuous-wave light to obtain the plurality of multi-wavelength continuous-wave light.

In still another possible implementation, combination, beam splitting, amplification, and second-time beam splitting processing may be sequentially performed on the plurality of single-wavelength continuous-wave light to obtain the plurality of multi-wavelength continuous-wave light.

Optionally, the method further includes the following step: obtaining a plurality of other single-wavelength continuous-wave light, where wavelengths of the plurality of other single-wavelength continuous-wave light are in a one-to-one correspondence with the wavelengths of the plurality of single-wavelength continuous-wave light. Before the second step in the fifth aspect is performed, one of two single-wavelength continuous-wave light with a same wavelength is selected for output, to obtain a new group of single-wavelength continuous-wave light, thereby implementing wavelength-level backup.

BRIEF DESCRIPTION OF DRAWINGS

The following describes in more details embodiments of this application with reference to accompanying drawings.

DESCRIPTION OF EMBODIMENTS

Figure 1:
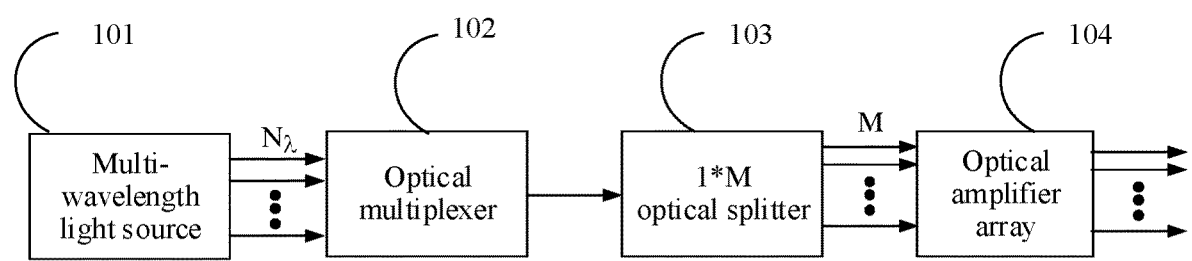
FIG. 1 is a schematic diagram of a structure of a multi-wavelength cluster light source according to an embodiment of the present invention.

Device forms and service scenarios described in embodiments of this application are intended to describe technical solutions in embodiments of the present invention more clearly, and do not constitute a limitation on the technical solutions provided in embodiments of the present invention. A person of ordinary skill in the art may know that, as a device form evolves and a new service scenario emerges, the technical solutions provided in embodiments of this application are also applicable to similar technical problems.

The technical solutions provided in this application are applicable to a scenario in which multi-wavelength channel transmission and a multi-channel light source are required, for example, a router network, a telecommunication Ethernet network, an optical access network, or a data center network. Specifically, the technical solutions provided in this application may be applied to a transmit side device and/or a receive side device corresponding to any one of the foregoing networks.

It should be noted that terms "first", "second", and the like in this application are used to distinguish similar objects, but are not necessarily intended to describe a specific order or sequence. It should be understood that data used in this way may be interchanged under appropriate circumstances so that embodiments described herein can be implemented in an order not described in this application. "And/or" is used to describe an association relationship between associated objects, and indicates that three relationships may exist. For example, A and/or B may represent the following three cases: Only A exists, both A and B exist, and only B exists. A specific operation method in a method embodiment may also be applied to an apparatus embodiment. Conversely, descriptions of a component function in the apparatus embodiment are also applicable to related descriptions in the method embodiment.

It should be further noted that, unless otherwise specified, specific descriptions of some technical features in one embodiment may also be applied to explaining corresponding technical features mentioned in another embodiment. For example, specific descriptions of a 1*M optical splitter in one embodiment are applicable to a corresponding 1*M optical splitter in another embodiment. For another example, a specific implementation of an optical switch array in one embodiment is applicable to an optical switch array in another embodiment. In addition, to more clearly reflect relationships between components in different embodiments, same or similar reference numerals are used in this application to represent components that have same or similar functions in different embodiments.

In addition, a connection mentioned in this application may be a direct connection or an indirect connection. For a specific connection relationship, refer to descriptions of subsequent corresponding embodiments. Unless otherwise specified, "connection" should not be understood restrictively.

Currently, for a scenario in which a relatively large quantity of light source modules are required, a plurality of light source modules with a same function are usually used for deployment, that is, mass deployment. For example, 25 multi-wavelength light source modules are deployed on a router, to meet a requirement in a specific application scenario for a quantity of multi-wavelength light sources. Usually, an existing light source module is an external full-function light source module. Specifically, the full-function light source module is a light source module that includes a colored light source and a multiplexing component, and that directly outputs one multi-wavelength continuous-wave light. External means that the light source module is inserted into an optical interface provided by a device for use.

Two main problems exist in the mass deployment of light source modules. First, due to restriction of factors such as a quantity of optical interfaces that can be provided by the device, and requirements for heat dissipation and/or power consumption, deployment is not flexible, and it is rather difficult to increase a quantity of light source modules (that is, capacity expansion). Then, the plurality of light source modules are deployed in a same device, and a difference between modules may lead to unstable performance of the device. In addition, it is found through research that, for the multi-wavelength light source (referred to as the colored light module in some cases), damage of a single wavelength is relatively common, but a current mass deployment solution requires replacement of the multi-wavelength light source module as a whole, thereby leading to relatively high costs.

Therefore, this application provides a new cluster light source. Based on a single light source, the cluster light source performs processing such as amplification and beam splitting, to output a plurality of continuous-wave light, so that a light source module with uniform and stable performance and relatively easy capacity expansion is provided for actual application. In addition, optionally, a light switch and a backup light source are added, so that the cluster light source can implement single wavelength-based backup at relatively low costs.

FIG. 1 is a schematic diagram of a structure of a multi-wavelength cluster light source according to an embodiment of the present invention. As shown in FIG. 1, a multi-wavelength cluster light source 100 includes a multi-wavelength light source 101, an optical multiplexer 102, a 1*M optical splitter 103, and an optical amplifier array 104. The multi-wavelength light source 101 is used to output a plurality of single-wavelength continuous-wave light in parallel, and wavelengths of the plurality of single-wavelength continuous-wave light are different. Parallel output means that the multi-wavelength light source 101 simultaneously outputs a plurality of continuous-wave light, instead of directly outputting one multi-wavelength continuous-wave light like a light source module in the conventional technology. It should be noted that for descriptions of a quantity of continuous-wave light, it may also be replaced with "channel" or "beam". Specifically, the parallel output may be implemented by using a parallel single mode (PSM) fiber, a waveguide, or space optics. The optical multiplexer 102 is configured to combine a plurality of single-wavelength light sources output by the multi-wavelength light source 101 into one multi-wavelength continuous-wave light. The 1*M optical splitter 103 is configured to perform power beam splitting on one multi-wavelength continuous-wave light output by the optical multiplexer 102, to obtain a plurality of multi-wavelength continuous-wave light. Specifically, an arrayed waveguide grating (AWG), a thin film filter (TFF), or the like may be used to implement the optical multiplexer. The optical amplifier array 104 is configured to amplify the plurality of multi-wavelength continuous-wave light output by the 1*M optical splitter 103, to provide an output of the multi-wavelength cluster light source 100 (that is, provide a plurality of multi-wavelength continuous-wave light with consistent performance). It should be understood that the optical amplifier array 104 includes a plurality of optical amplifiers, each of which is configured to amplify one multi-wavelength continuous-wave light. Alternatively, the optical amplifier array 104 may be replaced with a plurality of independent optical amplifiers. Specifically, the optical amplifier array 104 may use an erbium-doped fiber amplifier (EDFA) or a semiconductor optical amplifier (SOA).

It should be noted that the multi-wavelength cluster light source 100 shown in FIG. 1 may also be referred to as a light source pool or a cluster light source. The name is not limited in this application. A quantity of egress ports of the 1*M optical splitter 103 determines a quantity of multi-wavelength continuous-wave light that can be output by the multi-wavelength cluster light source 100. For example, M may be 16, 32, or even a larger value, to meet an actual application requirement.

It should be further noted that a quantity of optical amplifiers included in the optical amplifier array may be equal to a quantity of multi-wavelength continuous-wave light output by the 1*M optical splitter 103. Alternatively, a quantity of optical amplifiers included in the optical amplifier array may be greater than a quantity of multi-wavelength continuous-wave light output by the 1*M optical splitter 103. The latter design scheme facilitates capacity expansion of a system.

It should be understood that the optical amplifier array 104 may be alternatively placed between the multi-wavelength light source 101 and the optical multiplexer 102. For details, refer to specific descriptions in FIG. 4. Details are not described herein again.

It should be noted that the multi-wavelength light source 101 and the optical multiplexer 102 may be replaced with an existing optical module (that is, an optical transceiver module that outputs one multi-wavelength continuous-wave light).

By using a single multi-wavelength light source to perform multiplexing, optical splitting, and amplification processing, the multi-wavelength cluster light source 100 can output the plurality of multi-wavelength continuous-wave light with consistent performance, so that a stable input of the multi-wavelength light source is provided for a device requiring dense light source deployment. In addition, the multi-wavelength cluster light source 100 has a simple structure and relatively low equipment costs.

It should be noted that an optical splitter may also be referred to as a beam splitter. For example, a device such as a silicon-based waveguide chip or a photonic integrated circuit (PIC) planar lightwave circuit may be used to implement a beam splitter. In this application, letters such as M and N are used to represent a variable quantity of light split by the optical splitter. A specific value is not limited and may be comprehensively selected based on a specific requirement and a limiting factor (such as an area of a device board) during actual device design.

It should be understood that a band of continuous-wave light output by the multi-wavelength light source is not limited in this application, and may be a C band, an L band, a C+L band, or the like.

It should be further noted that, unless otherwise specified, in the multi-wavelength cluster light source provided in this embodiment of this application, components may be connected by using an optical fiber, the waveguide, or the space optics (that is, in a manner without direct physical connection). This is not limited in this application.

The following further describes this embodiment of this application in detail based on a common aspect related to the multi-wavelength cluster light source described above and with reference to more accompanying drawings.

Figure 2:
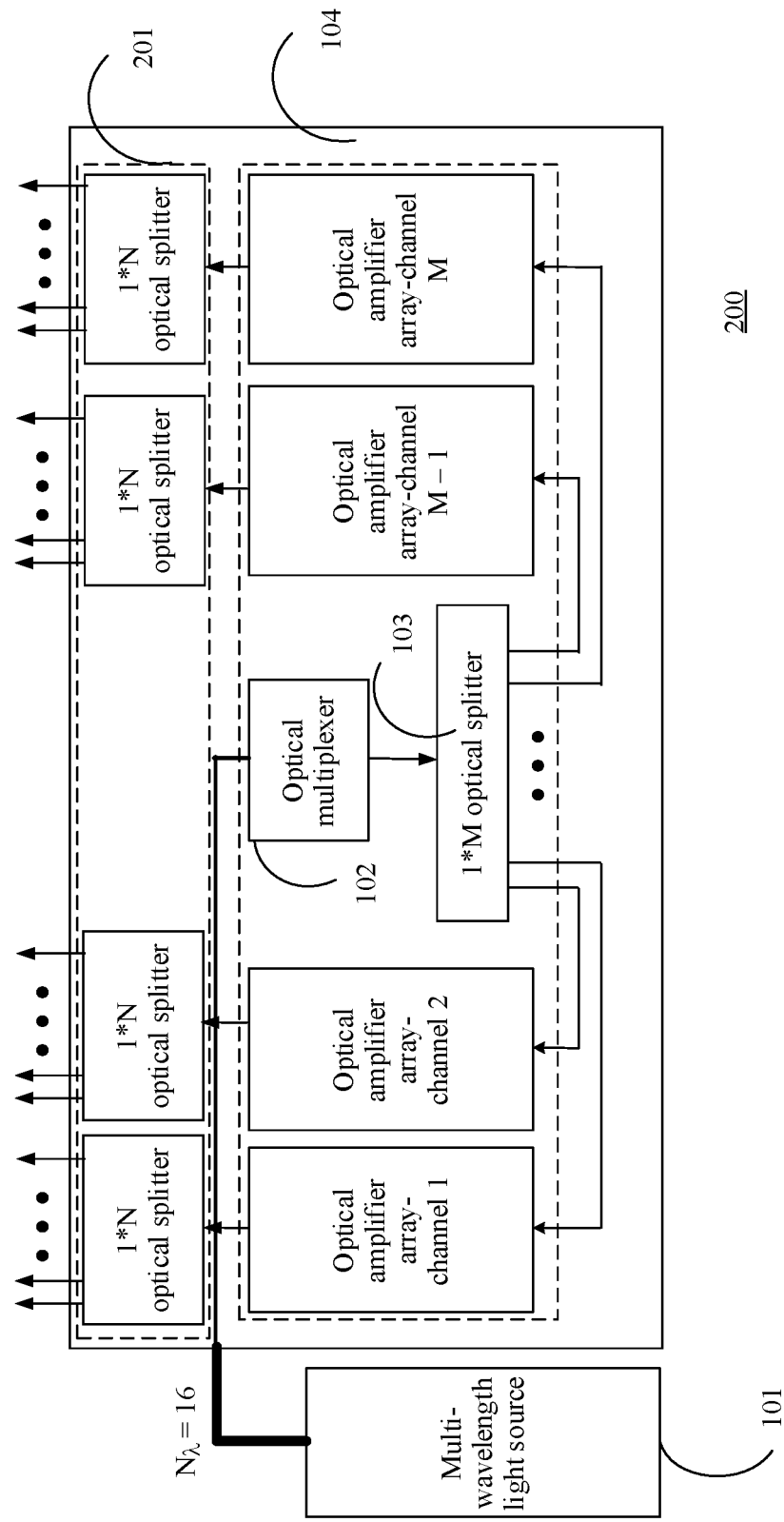
FIG. 2 is a schematic diagram of a structure of a first multi-wavelength cluster light source according to an embodiment of the present invention.

FIG. 2 is a schematic diagram of a structure of a first multi-wavelength cluster light source according to an embodiment of the present invention. As shown in FIG. 2, a multi-wavelength cluster light source 200 includes a multi-wavelength light source 101, an optical multiplexer 102, a 1*M optical splitter 103, an optical amplifier array 104, and a 1*N optical splitter 201. For descriptions of the multi-wavelength light source 101, the optical multiplexer 102, and the 1*M optical splitter 103, refer to FIG. 1. Details are not described herein again. It should be understood that, in this embodiment, a quantity of wavelengths output by the multi-wavelength light source 101 in parallel is 16 (that is, $N\lambda=16$ in FIG. 2).

It should be noted that, in this embodiment, the multi-wavelength light source may be made into a detachable optical module. The multi-wavelength light source is detachably connected to another part of the multi-wavelength cluster light source 200 by using a parallel optical interface. The another part of the wavelength cluster light source 200 may be designed to be a board, or may be designed on another existing board. In this way, an advantage is that if a problem occurs on the multi-wavelength light source, only the light source may be replaced and the another part may not be replaced, to reduce costs. It should be understood that the multi-wavelength light source may be alternatively made into an on-board optical (OBO) module.

As shown in FIG. 2, the optical amplifier array 104 includes M channels, namely, an optical amplifier array-channel 1, an optical amplifier array-channel 2, . . . , an optical amplifier array-channel M in the accompanying drawing. Each channel is used to amplify one channel of continuous-wave light output by the 1*M optical splitter 103. It should be noted that equivalence of a value of M and a quantity of channels of the optical amplifier array represents a relatively good design. However, the value of M does not necessarily need to be equal to a quantity of single-wavelength continuous-wave light output by the multi-wavelength light source in parallel, or their relationship may be that the former is greater than the latter. In this way, an advantage is that when capacity expansion is required, the multi-wavelength light source is directly replaced with a light source that outputs a larger quantity of continuous-wave light, and another device does not need to be replaced, thereby reducing costs.

Different from the embodiment shown in FIG. 1, the multi-wavelength cluster light source 200 further includes the 1*N optical splitter 201, configured to perform second-time beam splitting on multi-wavelength continuous-wave light output by the optical amplifier array 104, to obtain an output of a larger quantity of multi-wavelength continuous-wave light. To be specific, the multi-wavelength cluster light source 200 can output a maximum of M*N multi-wavelength light sources, so that a quantity of output multi-wavelength continuous-wave light is larger than that provided in the embodiment of FIG. 1, and a requirement of a network scenario for dense light sources can be better met with a relatively simple structure. For example, M=32, N=3, and a total of 35 optical splitters with a relatively small quantity of ports can output 96 channels of 16-wavelength continuous-wave light. Compared with a solution in which a 96-port optical splitter is used, the foregoing solution has a simpler structure and is easier to implement. Values of M and N may be set based on a requirement of actual application. For example, M=4, N=10, and 40 channels of multi-wavelength light are output. For another example, M=8, N=8, and 64 channels of multi-wavelength light sources are output.

It should be understood that a quantity of 1*N optical splitters 201 may be less than or equal to M. If the quantity of 1*N optical splitters 201 is less than M, the multi-wavelength cluster light source 200 may provide multi-wavelength light sources with different powers for different application requirements, thereby providing better application flexibility.

Optionally, the optical multiplexer and the 1*M optical splitter 103 may be integrated into a single chip, and is usually implemented by using a silicon-based waveguide chip or a PIC planar lightwave circuit device, to implement miniaturization of a cluster light source as a whole.

It should be understood that FIG. 2 that shows relative positions of components is a schematic diagram of an actual hardware layout, and board space may be properly laid out, thereby helping reduce device space that needs to be occupied by the multi-wavelength cluster light source 200.

Figure 3:
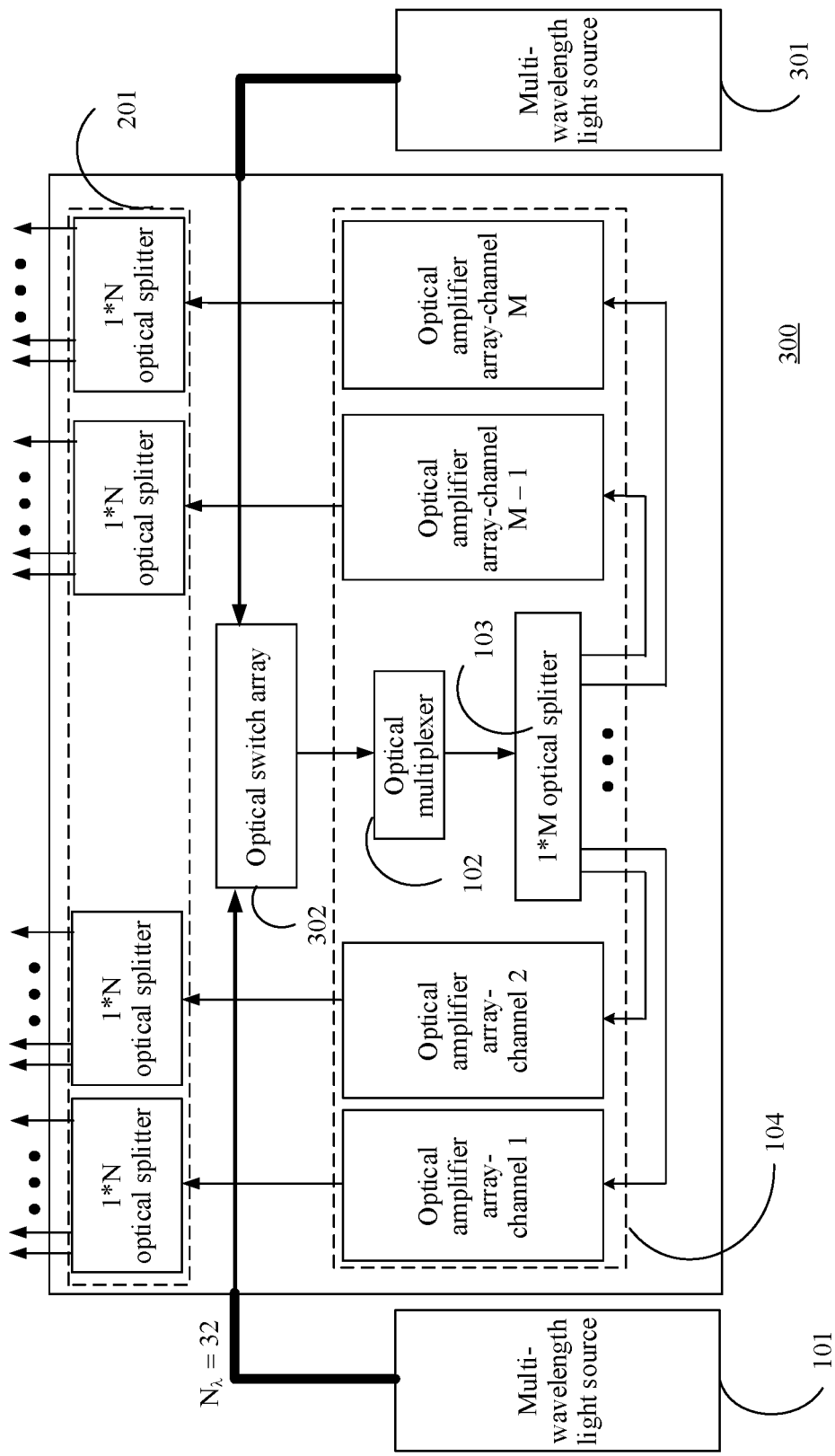
FIG. 3 is a schematic diagram of a structure of a second multi-wavelength cluster light source according to an embodiment of the present invention.

FIG. 3 is a schematic diagram of a structure of a second multi-wavelength cluster light source according to an embodiment of the present invention. As shown in FIG. 3, a multi-wavelength cluster light source 300 includes a multi-wavelength light source 101, a multi-wavelength light source 301, an optical switch array 302, an optical multiplexer 102, a 1*M optical splitter 103, an optical amplifier array 104, and a 1*N optical splitter 201. For descriptions of the multi-wavelength light source 101, the optical multiplexer 102, the 1*M optical splitter 103, and the 1*N optical splitter 201, refer to FIG. 2. Details are not described herein again. It should be understood that, in this embodiment, a quantity of wavelengths output by the multi-wavelength light source 101 in parallel is 32 (that is, N2=32 in FIG. 3).

Different from the embodiment shown in FIG. 2, in the embodiment shown in FIG. 3, the multi-wavelength light source 301 and the optical switch array 302 are added. The multi-wavelength light source 301 and the multi-wavelength light source 101 have a similar function, and are both configured to output a plurality of single-wavelength continuous-wave light (that is, 32 single-wavelength continuous-wave light) in parallel. A difference is that the former serves as a backup for the latter. To be specific, if one or more single-wavelength continuous-wave light in the multi-wavelength light source 101 fail or deteriorate in performance, single-wavelength continuous-wave light with a same wavelength in the multi-wavelength light source 301 may be selected as a substitute by using the optical switch array. In this way, the multi-wavelength cluster light source 300 can still provide a stable output of a plurality of multi-wavelength continuous-wave light, even if the multi-wavelength light source 101 is faulty, and a service life of the multi-wavelength cluster light source 300 is greatly prolonged.

Optionally, a plurality of backup multi-wavelength light sources 301 may be provided, to cope with multiple failures of a single-wavelength continuous-wave light, thereby further prolonging a service life of the multi-wavelength cluster light sources 300. Correspondingly, the optical switch array needs to use a 1-out-of-N optical switch.

It should be understood that a quantity of optical switches included in the optical switch array should be greater than or equal to a quantity of single-wavelength continuous-wave light output by the multi-wavelength light source. The optical switch array is implemented in either an integrated manner or a discrete manner. In addition, the optical switch array, the optical multiplexer, and/or the 1*M optical splitter may be integrated into a single chip, and implemented by a silicon-based waveguide chip or a PIC planar lightwave circuit device, to implement miniaturization of an architecture of a cluster light source as a whole.

Through cooperation of the optical switch and the plurality of multi-wavelength light sources, the multi-wavelength cluster light source 300 in this embodiment of this application can implement wavelength-level backup, so that a service life of the multi-wavelength cluster light source 300 at relatively low costs is prolonged, and system stability is improved.

Figure 4:
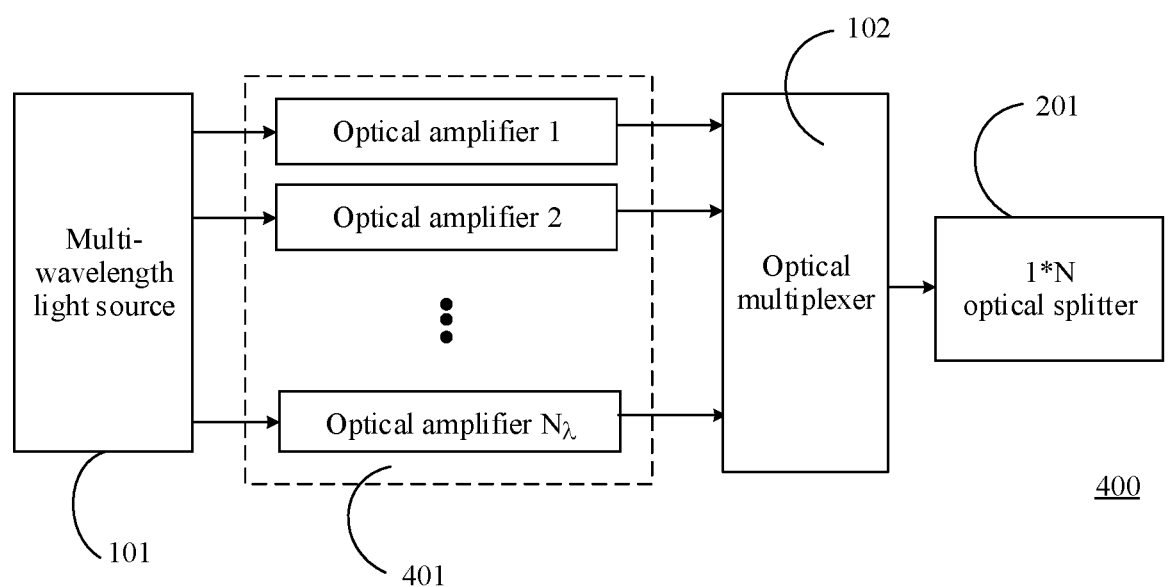
FIG. 4 is a schematic diagram of a structure of a third multi-wavelength cluster light source according to an embodiment of the present invention.

FIG. 4 is a schematic diagram of a structure of a third multi-wavelength cluster light source according to an embodiment of the present invention. As shown in FIG. 4, the multi-wavelength cluster light source 400 includes a multi-wavelength light source 101, an optical multiplexer 102, a 1*N optical splitter 201, and an optical amplifier 401. For descriptions of the multi-wavelength light source 101 and the 1*N optical splitter 201, refer to FIG. 2. Details are not described herein again.

Different from the foregoing embodiments, in this embodiment, the optical amplifier is placed between the multi-wavelength light source 101 and the optical multiplexer 102; a quantity of optical amplifiers is not less than a quantity of single-wavelength continuous-wave light output by the multi-wavelength light source 101, and the optical amplifier is configured to amplify a plurality of single-wavelength continuous-wave light output by the multi-wavelength light source 101. The optical multiplexer 102 is configured to combine a plurality of amplified single-wavelength continuous-wave light, to obtain one beam of multi-wavelength continuous-wave light. Finally, the 1*N optical splitter 201 performs power beam splitting on the beam of multi-wavelength continuous-wave light, to obtain N multi-wavelength continuous-wave light as an output of the multi-wavelength cluster light source 400.

It should be understood that the optical splitter 201 may be implemented by using one optical splitter. Alternatively, the optical splitter 201 may be implemented through concatenation of a plurality of optical splitters. For example, one 1*(M*N) optical splitter may be implemented by using one 1*M optical splitter and M 1*N optical splitters. The latter is easier to implement, and power of light output through optical splitting is more balanced.

It should be understood that, the optical amplifier in this embodiment of this application is different from the optical amplifier arrays shown in FIG. 1 to FIG. 3. The optical amplifier in this embodiment of this application is only used to amplify a single wavelength, and has relatively low costs. Therefore, on a premise that an output of the same quantity of multi-wavelength continuous-wave light is provided, costs of the multi-wavelength cluster light source 400 provided in this embodiment of this application are relatively low.

Figure 5:
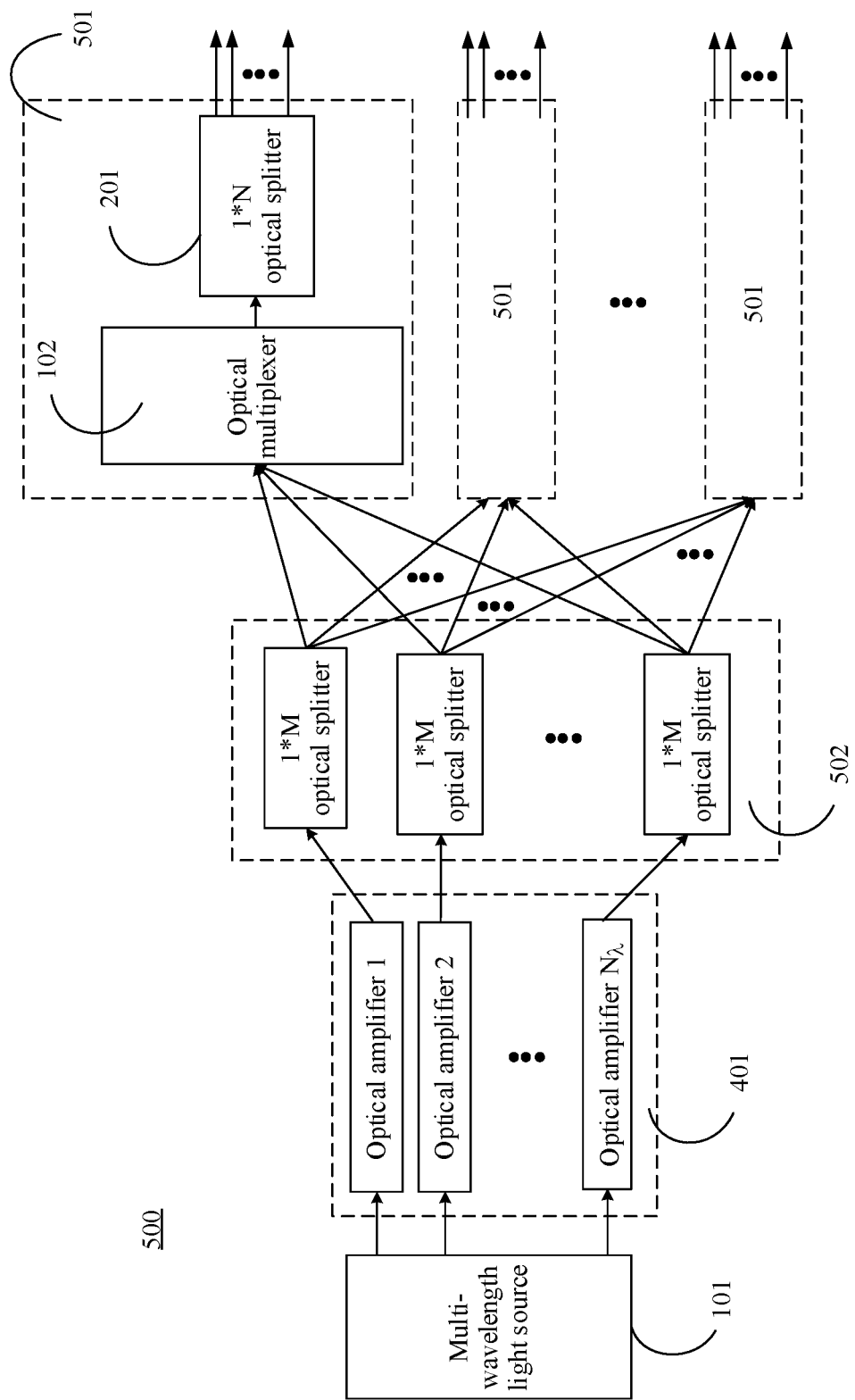
FIG. 5 is a schematic diagram of a structure of a fourth multi-wavelength cluster light source according to an embodiment of the present invention.

FIG. 5 is a schematic diagram of a structure of a fourth multi-wavelength cluster light source according to an embodiment of the present invention. As shown in FIG. 5, the multi-wavelength cluster light source 500 includes a multi-wavelength light source 101, an optical amplifier 401, a plurality of 1*M optical splitter 502, a plurality of optical multiplexers 102, and a 1*N optical splitters 201. For descriptions of the multi-wavelength light source 101, the optical amplifier 401, the optical multiplexer 102, and the 1*N optical splitter 201, refer to FIG. 4. Details are not described herein again.

It should be noted that, in FIG. 5, one optical multiplexer 102 and one 1*N optical splitter 201 constitute a component 501. The multi-wavelength cluster light source 500 includes a plurality of components 501. These components 501 and a plurality of 1*M optical splitters are physically connected, for example, connected by using a waveguide or an optical fiber.

Different from the embodiment shown in FIG. 4, in this embodiment, the plurality of 1*M optical splitters are added to the multi-wavelength cluster light source, to implement two-stage optical splitting, and obtain an output of M*N channels of multi-wavelength continuous-wave light at relatively low costs. It should be understood that continuous-wave light of each 1*M optical splitter is input and output with different wavelengths. Therefore, one optical multiplexer 102 and each 1*M optical splitter are connected to combine all single-wavelength continuous-wave light with different wavelengths.

Figure 6:
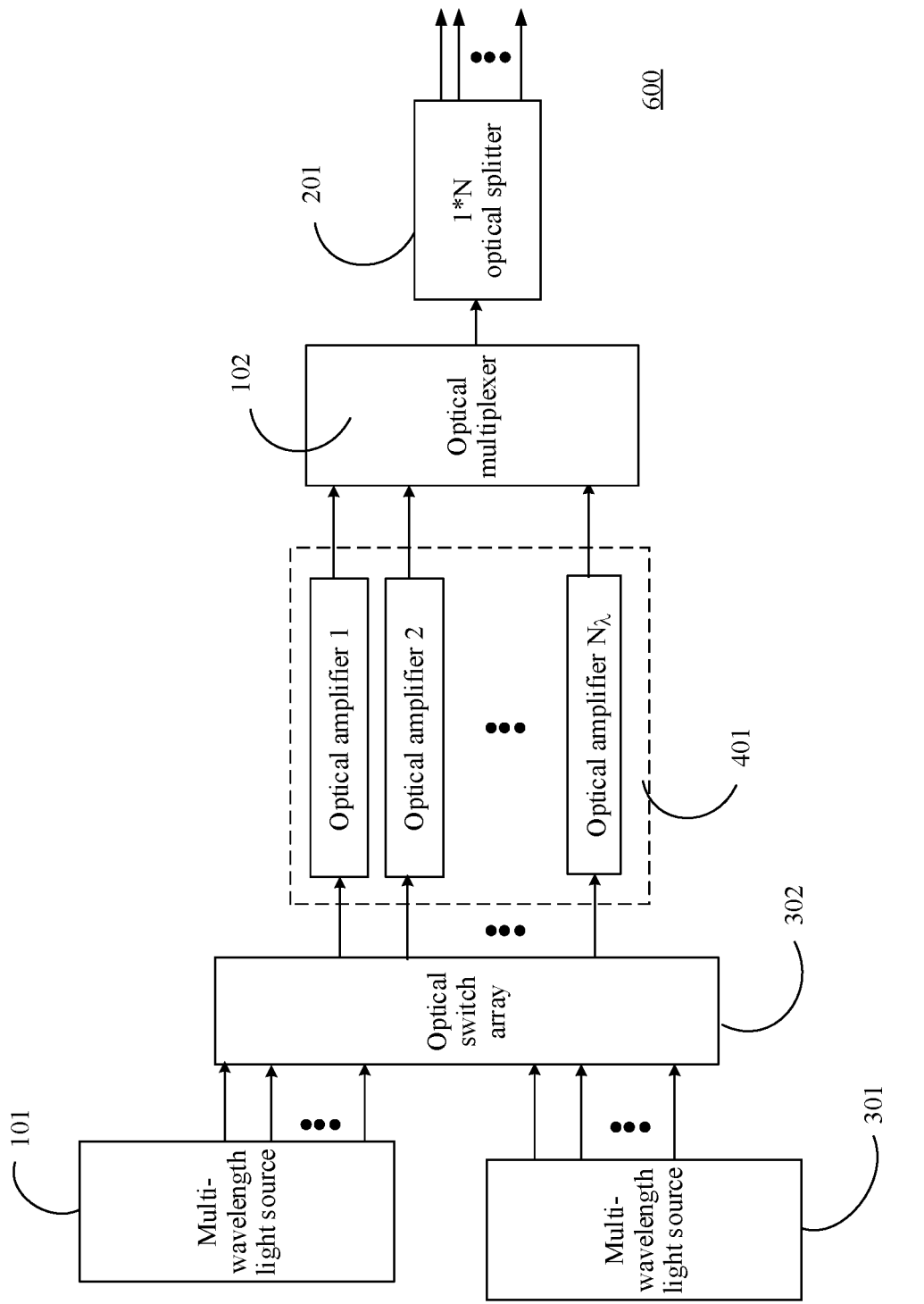
FIG. 6 is a schematic diagram of a structure of a fifth multi-wavelength cluster light source according to an embodiment of the present invention.

FIG. 6 is a schematic diagram of a structure of a fifth multi-wavelength cluster light source according to an embodiment of the present invention. As shown in FIG. 6, the multi-wavelength cluster light source 600 includes a multi-wavelength light source 101, a multi-wavelength light source 301, an optical switch array 302, an optical amplifier 401, an optical multiplexer 102, and a 1*N optical splitter 201. For descriptions of these components, refer to related descriptions in FIG. 1 or FIG. 4. Details are not described herein again. Similar to FIG. 4, the multi-wavelength cluster light source 600 also selects, by using the optical switch array, a wavelength from two continuous-wave light that provide backup for each other, to provide backup for a plurality of single-wavelength continuous-wave light. Through cooperation of an optical switch and a plurality of multi-wavelength light sources, the multi-wavelength cluster light source 600 can implement wavelength-level backup, so that a service life of the multi-wavelength cluster light source 600 is prolonged at relatively low costs.

It should be understood that in this embodiment, an optical splitter may also be designed as a two-stage optical splitter similar to FIG. 5. Details are not described herein again.

Figures 7, 8:
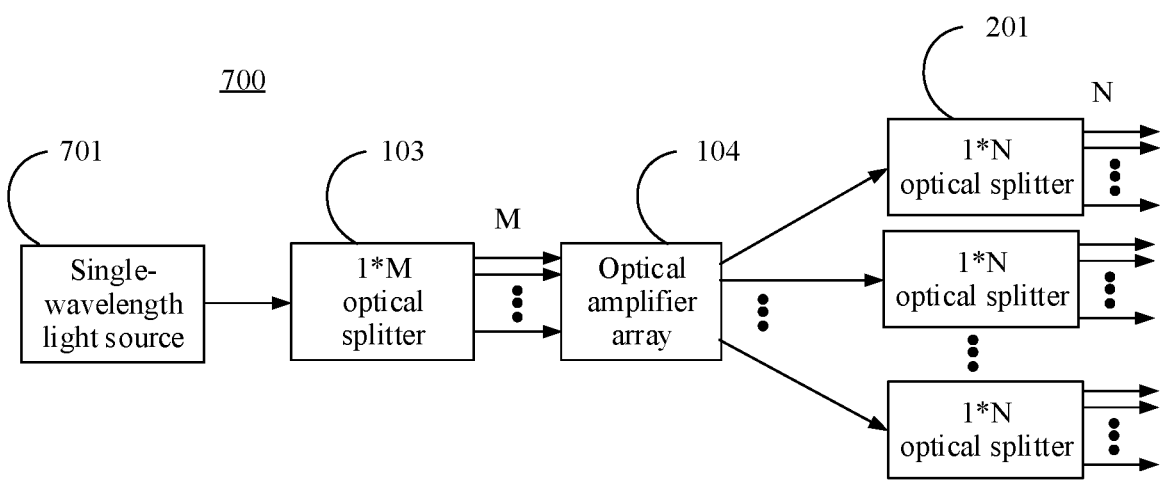
FIG. 7 is a schematic diagram of a structure of a single-wavelength cluster light source according to an embodiment of the present invention.
FIG. 8 is a schematic flowchart of a method for generating a cluster light source according to an embodiment of the present invention.

FIG. 7 is a schematic diagram of a structure of a single-wavelength cluster light source according to an embodiment of the present invention. As shown in FIG. 7, a single-wavelength cluster light source 700 includes a single-wavelength light source 701, a 1*M optical splitter 103, an optical amplifier array 104, and a 1*N optical splitter 201. For descriptions of the 1*M optical splitter 103, and the 1*N optical splitter 201, refer to FIG. 3. Details are not described herein again. It should be understood that in this embodiment, the single-wavelength light source 701 is configured to output one or more single-wavelength continuous-wave light.

Compared with an existing solution in which dense light sources are provided by using a plurality of single-wavelength light source modules, the single-wavelength cluster light source 700 can provide an output of a plurality of continuous-wave light with better consistency. In addition, the single-wavelength cluster light source 700 has a simple structure, and a volume occupied by the single-wavelength cluster light source 700 is significantly reduced compared with the existing solution.

FIG. 8 is a schematic flowchart of a method for generating a cluster light source according to an embodiment of the present invention. As shown in FIG. 8, the method for generating a cluster light source includes the following two steps.

S801: Obtain a plurality of single-wavelength continuous-wave light, where wavelengths of the plurality of single-wavelength continuous-wave light are different.

S803: Perform combination, beam splitting, and amplification processing on the plurality of single-wavelength continuous-wave light to obtain a plurality of multi-wavelength continuous-wave light.

Specifically, step S803 has a plurality of implementations. In a possible implementation, combination, beam splitting, and amplification processing may be sequentially performed on the plurality of single-wavelength continuous-wave light to obtain the plurality of multi-wavelength continuous-wave light. In another possible implementation, amplification, combination, and beam splitting processing may be sequentially performed on the plurality of single-wavelength continuous-wave light to obtain the plurality of multi-wavelength continuous-wave light. In still another possible implementation, combination, beam splitting, amplification, and second-time beam splitting processing may be sequentially performed on the plurality of single-wavelength continuous-wave light to obtain the plurality of multi-wavelength continuous-wave light.

Optionally, the method may further include the following step: obtaining a plurality of other single-wavelength continuous-wave light, where wavelengths of the plurality of other single-wavelength continuous-wave light are in a one-to-one correspondence with the wavelengths of the plurality of single-wavelength continuous-wave light. Then, before step S803 is performed, one of two single-wavelength continuous-wave light with a same wavelength is selected for output, to obtain a new group of single-wavelength continuous-wave light, and then related processing of S803 is performed.

It should be understood that, selecting one of two single-wavelength continuous-wave light with a same wavelength may be specifically determined by using power of single-wavelength continuous-wave light that is to be selected. For example, for two continuous-wave light whose wavelengths are both 21, if it is detected that a power value of one continuous-wave light is lower than a preset threshold, the other continuous-wave light may be selected as a single-wavelength continuous-wave light for subsequent processing.

It should be understood that for effects corresponding to the foregoing method steps, refer to descriptions in the foregoing apparatus embodiments. Details are not described herein again.

Figure 9:
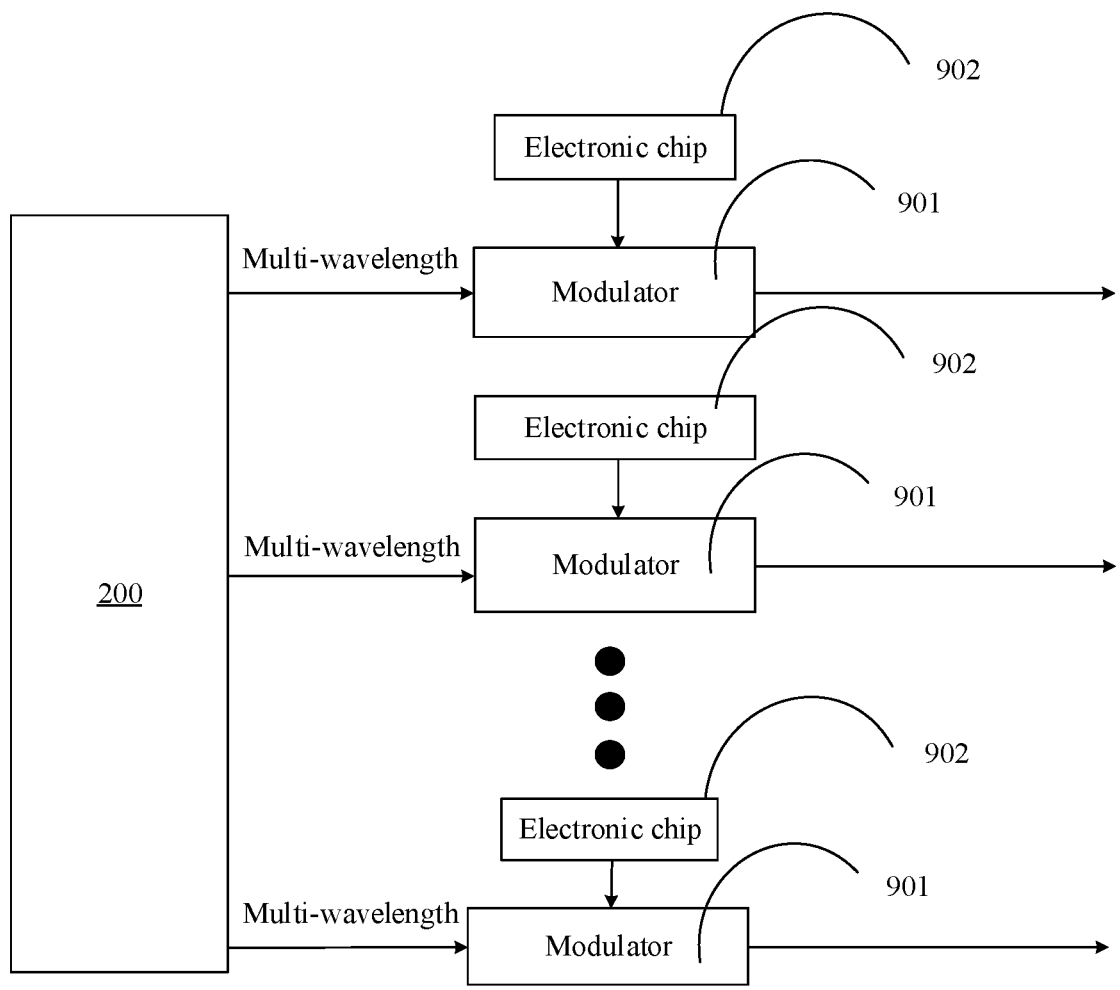
FIG. 9 is a schematic diagram of a structure of a communication device according to an embodiment of the present invention.

FIG. 9 is a schematic diagram of a structure of a communication device according to an embodiment of the present invention. As shown in FIG. 9, a communication device 900 includes a multi-wavelength cluster light source 200, one or more modulators 901, and one or more electronic chips 902. The multi-wavelength cluster light source 200 outputs a plurality of multi-wavelength continuous-wave light to a plurality of modulators 901 (the plurality of multi-wavelength continuous-wave light are in a one-to-one correspondence with the plurality of modulators 901), and the plurality of electronic chips 902 respectively provide client signals to the plurality of modulators 901. Each modulator 901 modulates a client signal to one multi-wavelength continuous-wave light provided by the multi-wavelength cluster light source 200, and then sends the multi-wavelength continuous-wave light, to implement transmission of the client signal. It should be noted that, a quantity of client signals output by the electronic chip 902 matches a quantity of the multi-wavelength continuous-wave light output by the multi-wavelength cluster light source 200, so that one client signal is modulated to one wavelength.

It should be understood that the multi-wavelength cluster light source 200 may be replaced with another multi-wavelength cluster light source described in any one of the foregoing embodiments of this application, for example, the multi-wavelength cluster light source and related variant solutions that are shown in FIG. 3 to FIG. 6. It should be further noted that the multi-wavelength cluster light source 200 may be alternatively replaced with a single-wavelength cluster light source, to meet a requirement for single wavelength-based signal transmission.

Optionally, the communication device 900 may further include an optical cross-connection, to implement space switching of a wavelength carrying a client signal, and then send the wavelength to implement transmission of the client signal.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A multi-wavelength cluster light source comprising:
a first light source, an optical multiplexer, a first optical splitter, an optical amplifier array and an optical switch array, wherein
the first light source is used to output a plurality of single-wavelength continuous-wave light in parallel, wherein wavelengths of the plurality of single-wavelength continuous-wave light are different;
the optical multiplexer is configured to combine the plurality of single-wavelength continuous-wave light into one first multi-wavelength continuous-wave light, including combining a plurality of single-wavelength continuous-wave light selected and output by the optical switch array into the first multi-wavelength continuous-wave light;
the first optical splitter is configured to perform power beam splitting on the first multi-wavelength continuous-wave light, to output a plurality of second multi-wavelength continuous-wave light;
the optical amplifier array is used to amplify the plurality of second multi-wavelength continuous-wave light, to output a plurality of third multi-wavelength continuous-wave light;
the optical switch array is used to receive the plurality of single-wavelength continuous-wave light and a plurality of other single-wavelength continuous-wave light output by a second light source,
wherein wavelengths of the plurality of other single-wavelength continuous-wave light are in a one-to-one correspondence with the wavelengths of the plurality of single-wavelength continuous-wave light,
wherein a quantity of optical switches comprised in the optical switch array is equal to a quantity of the plurality of single-wavelength continuous-wave light, and
wherein each optical switch of the optical switch array is used to select any one of two single-wavelength continuous-wave light having a same wavelength in the plurality of single-wavelength continuous-wave light or in the plurality of other single-wavelength continuous-wave light, to input the selected single-wavelength continuous-wave light into the optical multiplexer.

2. The multi-wavelength cluster light source according to claim 1, further comprising:
a second optical splitter, configured to perform power beam splitting on at least some of the plurality of third multi-wavelength continuous-wave light, to output a plurality of fourth multi-wavelength continuous-wave light, and
wherein a quantity of second optical splitters is less than or equal to a quantity of the plurality of third multi-wavelength continuous-wave light.

3. The multi-wavelength cluster light source according to claim 2, further comprising:
an optical switch array, used to receive the plurality of single-wavelength continuous-wave light and a plurality of other single-wavelength continuous-wave light output by the second light source,
wherein wavelengths of the plurality of other single-wavelength continuous-wave light are in a one-to-one correspondence with the wavelengths of the plurality of single-wavelength continuous-wave light,
wherein a quantity of optical switches comprised in the optical switch array is equal to a quantity of the plurality of single-wavelength continuous-wave light, and
wherein each optical switch of the optical switch array is used to select any one of two single-wavelength continuous-wave light having a same wavelength in the plurality of single-wavelength continuous-wave light or in the plurality of other single-wavelength continuous-wave light, to input the selected single-wavelength continuous-wave light into the optical multiplexer; and
wherein in combining the plurality of single-wavelength continuous-wave light into first multi-wavelength continuous-wave light, the optical multiplexer is further configured to:
combine a plurality of single-wavelength continuous-wave light selected and output by the optical switch into the first multi-wavelength continuous-wave light.

4. The multi-wavelength cluster light source according to claim 1, wherein the optical multiplexer and the first optical splitter are integrated in a single chip.

5. The multi-wavelength cluster light source according to claim 1, wherein the optical switch array, the optical multiplexer, and the first optical splitter are integrated in a single chip.

6. The multi-wavelength cluster light source according to claim 1, further comprising: the second light source.

7. A multi-wavelength cluster light source comprising:
a first light source, an optical amplifier array, an optical multiplexer, a first optical splitter, and an optical switch array, wherein
the first light source is used to output a plurality of first single-wavelength continuous-wave light in parallel, and
wherein wavelengths of the plurality of first single-wavelength continuous-wave light are different;
the optical amplifier array is used to amplify the plurality of first single-wavelength continuous-wave light;
the optical multiplexer is configured to combine the plurality of amplified first single-wavelength continuous-wave light into one first multi-wavelength continuous-wave light;
the first optical splitter is configured to perform power beam splitting on the first multi-wavelength continuous-wave light, to output a plurality of second multi-wavelength continuous-wave light; and
the optical switch array is used to receive the plurality of first single-wavelength continuous-wave light and a plurality of third single-wavelength continuous-wave light output by a second light source,
wherein wavelengths of the plurality of third single-wavelength continuous-wave light are in a one-to-one correspondence with the wavelengths of the plurality of first single-wavelength continuous-wave light,
wherein a quantity of optical switches comprised in the optical switch array is equal to a quantity of the plurality of first single-wavelength continuous-wave light, and
wherein each optical switch of the optical switch array is used to select any one of two single-wavelength continuous-wave light having a same wavelength in the plurality of first single-wavelength continuous-wave light or in the plurality of third single-wavelength continuous-wave light, to input the selected single-wavelength continuous-wave light into the optical amplifier array; and
wherein in amplifying the plurality of first single-wavelength continuous-wave light, the optical amplifier array is further used for a plurality of single-wavelength continuous-wave light selected and output by the optical switch.

8. The multi-wavelength cluster light source according to claim 7, further comprising:
a second optical splitter, configured to perform power beam splitting on each of the plurality of amplified first single-wavelength continuous-wave light, to output a plurality of second single-wavelength continuous-wave light; and
wherein in combining the plurality of amplified first single-wavelength continuous-wave light into first multi-wavelength continuous-wave light, the optical multiplexer is further configured to:
combine the plurality of second single-wavelength continuous-wave light having different wavelengths into the first multi-wavelength continuous-wave light,
wherein a quantity of optical multiplexers is equal to a quantity of the plurality of second single-wavelength continuous-wave light obtained by performing power beam splitting on any one of the plurality of first single-wavelength continuous-wave light.

9. The multi-wavelength cluster light source according to claim 7, wherein the optical multiplexer and the first optical splitter are integrated in a single chip.

10. The multi-wavelength cluster light source according to claim 7, further comprising: the second light source.

11. A communication device comprising a multi-wavelength cluster light source, a modulator, and an electronic chip, wherein:
the multi-wavelength cluster light source comprises a first light source, an optical multiplexer, a first optical splitter, an optical amplifier array, and an optical switch array, wherein
the first light source is used to output a plurality of single-wavelength continuous-wave light in parallel, and wavelengths of the plurality of single-wavelength continuous-wave light are different;
the optical multiplexer is configured to combine the plurality of single-wavelength continuous-wave light into one first multi-wavelength continuous-wave light;
the first optical splitter is configured to perform power beam splitting on the first multi-wavelength continuous-wave light, to output a plurality of second multi-wavelength continuous-wave light;
the optical amplifier array is used to amplify the plurality of second multi-wavelength continuous-wave light, to output a plurality of third multi-wavelength continuous-wave light;
the multi-wavelength continuous-wave light output by the multi-wavelength cluster light source is used to be input to the modulator, the electronic chip outputs a service signal to the modulator, and the modulator is configured to modulate the service signal to the multi-wavelength continuous-wave light; and
wherein the optical switch array is used to receive the plurality of first single-wavelength continuous-wave light and a plurality of third single-wavelength continuous-wave light output by a second light source,
wherein wavelengths of the plurality of third single-wavelength continuous-wave light are in a one-to-one correspondence with the wavelengths of the plurality of first single-wavelength continuous-wave light,
wherein a quantity of optical switches comprised in the optical switch array is equal to a quantity of the plurality of first single-wavelength continuous-wave light and
wherein each optical switch of the optical switch array is used to select any one of two single-wavelength continuous-wave light having a same wavelength in the plurality of first single-wavelength continuous-wave light or in the plurality of third single-wavelength continuous-wave light, to input the selected single-wavelength continuous-wave light into the optical amplifier array; and
wherein in amplifying the plurality of first single-wavelength continuous-wave light, the optical amplifier array is further used for a plurality of single-wavelength continuous-wave light selected and output by the optical switch.

12. The communication device according to claim 11, wherein the optical multiplexer and the first optical splitter are integrated in a single chip.

13. The communication device according to claim 11, further comprising:
   an optical cross-connection, configured to: perform space switching on the multi-wavelength continuous-wave light carrying the service signal, and then send the multi-wavelength continuous-wave light.

14. The communication device according to claim 13, wherein the communication device is a router, a switch, or an optical communication device.

15. The communication device according to claim 11, wherein the communication device is a router, a switch, or an optical communication device.

* * * * *

UNITED STATES PATENT AND TRADEMARK OFFICE
CERTIFICATE OF CORRECTION

PATENT NO. : 12,323,189 B2
APPLICATION NO. : 18/070160
DATED : June 3, 2025
INVENTOR(S) : Zhang et al.

Page 1 of 1

It is certified that error appears in the above-identified patent and that said Letters Patent is hereby corrected as shown below:

On the Title Page

Item (30) Foreign Application Priority Data insert: -- May 29, 2020 (CN) .......... 202010475727.0 --.

In the Claims

Claim 11: Column 16, Line 54: "light and" should read as -- light, and --.

Signed and Sealed this
Twenty-first Day of October, 2025

John A. Squires
*Director of the United States Patent and Trademark Office*